(12) United States Patent
Sterling et al.

(10) Patent No.: US 12,129,944 B2
(45) Date of Patent: Oct. 29, 2024

(54) HYDRAULIC FITTING, AND APPLICATIONS THEREOF IN ROBOT SYSTEMS

(71) Applicant: Sanctuary Cognitive Systems Corporation, Vancouver (CA)

(72) Inventors: George E. G. Sterling, Vancouver (CA); Connor Richard Shannon, Vancouver (CA); Douglas Bruce Jelstad, Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 108 days.

(21) Appl. No.: 17/863,333

(22) Filed: Jul. 12, 2022

(65) Prior Publication Data

US 2023/0015663 A1   Jan. 19, 2023

Related U.S. Application Data

(60) Provisional application No. 63/220,584, filed on Jul. 12, 2021.

(51) Int. Cl.
*F16L 21/03* (2006.01)
*B25J 9/14* (2006.01)
(Continued)

(52) U.S. Cl.
CPC .............. *F16L 21/03* (2013.01); *B25J 9/14* (2013.01); *F16L 41/086* (2013.01); *F16L 33/32* (2013.01); *Y10T 29/49826* (2015.01)

(58) Field of Classification Search
CPC . F16L 21/03; F16L 33/28; F16L 33/00; F16L 33/20; F16L 33/222; F16L 33/32;
(Continued)

(56) References Cited

U.S. PATENT DOCUMENTS 2,819,099 A * 1/1958 Rittle .................... F16L 41/086
3,266,824 A * 8/1966 Nealy ..................... F16L 19/08
(Continued)

FOREIGN PATENT DOCUMENTS

DE         19818571 A1 * 11/1999

OTHER PUBLICATIONS

DE-19818571-A1—Machine Translation—English (Year: 1999).*

*Primary Examiner* — William S. Choi
(74) *Attorney, Agent, or Firm* — Thomas Mahon; Adenike Adebiyi

(57) ABSTRACT

In an implementation, a method of forming a hydraulic connection between a hydraulic component and a hydraulic hose includes threading a ferrule onto an end section of the hydraulic hose, crimping the ferrule to the hydraulic hose, and threading an annular gasket onto the hydraulic hose between the ferrule and an open end of the end section of the hydraulic hose. The method may include securing the hydraulic hose to a body of the hydraulic component by forming a seal between the body and the hydraulic hose by compression. Threading the ferrule onto the hydraulic hose may include threading an annular ferrule having a profile of a first truncated cone with a first half-aperture, and urging the ferrule towards an interface in the body of the hydraulic component, the interface having a profile of a second truncated cone with a second half-aperture different from the first half-aperture.

12 Claims, 5 Drawing Sheets

(51) Int. Cl.
*F16L 33/32* (2006.01)
*F16L 41/08* (2006.01)

(58) Field of Classification Search
CPC ......... F16L 41/08; F16L 41/086; F16L 41/00; F16L 19/025; F16L 19/08; F16L 23/0286; F16L 37/008; F16L 37/0925
See application file for complete search history.

(56) References Cited

U.S. PATENT DOCUMENTS

| | | | |
|---|---|---|---|
| 3,765,706 A * | 10/1973 | Bram | F16L 21/03 |
| 3,971,577 A * | 7/1976 | Schemith | F16L 37/008 |
| 4,600,221 A * | 7/1986 | Bimba | F16L 37/008 |
| 4,952,262 A * | 8/1990 | Washkewicz | |
| 5,655,796 A * | 8/1997 | Bartholomew | F16L 37/008 |
| 8,075,022 B2 * | 12/2011 | Blassmann | F16L 37/008 |
| 2006/0022458 A1 * | 2/2006 | Droste | F16L 41/086 |
| 2011/0186658 A1 * | 8/2011 | Wuchert | F16L 41/00 |
| 2022/0018469 A1 * | 1/2022 | Russell | |

* cited by examiner

HYDRAULIC FITTING, AND APPLICATIONS THEREOF IN ROBOT SYSTEMS

TECHNICAL FIELD

The present systems, devices, and methods generally relate to hydraulic fittings, and particularly relate to hydraulic fittings for hydraulically-actuated robotic components.

BACKGROUND

Robots are machines that can assist humans or substitute for humans. Robots can be used in diverse applications including construction, manufacturing, monitoring, exploration, learning, and entertainment. Robots can be used in dangerous or uninhabitable environments, for example.

Some robots require user input, and can be operated by humans. Other robots have a degree of autonomy, and can operate, in at least some situations, without human intervention. Some autonomous robots are designed to mimic human behavior. Autonomous robots can be particularly useful in applications where robots are needed to work for an extended time without operator intervention, to navigate within their operating environment, and/or to adapt to changing circumstances.

Hydraulics is a technology involving mechanical properties and use of liquids, which is based on a theoretical foundation provided by fluid mechanics. In fluid power applications, hydraulics can be used for the generation, control, transmission, and distribution of power. In robotic applications, hydraulics can be used, alone or in combination with electric motors and other power sources, to distribute power to a robot's components, e.g., actuators.

BRIEF SUMMARY

A method of forming a hydraulic connection between a hydraulic component and a hydraulic hose may be summarized as comprising threading a ferrule onto an end section of the hydraulic hose, the end section of the hydraulic hose having an open end, crimping the ferrule to the end section of the hydraulic hose, and threading an annular gasket onto the end section of the hydraulic hose between the ferrule and the open end of the hydraulic hose, the annular gasket concentric with, and adjacent to, the ferrule.

In some implementations, the hydraulic component comprises a first port and a second port, and an axial bore extending between the first and the second port, and the method further comprises inserting the hydraulic hose into the axial bore of the body through the first port. The inserting the hydraulic hose into the axial bore of the body through the first port may include inserting a length of the hydraulic hose into the axial bore of the body, the length of the hydraulic hose being less than a distance along the axial bore between the first port and the second port. The method may further comprise securing the hydraulic hose to the body. The securing the hydraulic hose to the body may include forming a seal between the body and the hydraulic hose by compression. The threading a ferrule onto an end section of the hydraulic hose may include threading an annular ferrule having a profile of a first truncated cone, the first truncated cone having a first half-aperture, and the forming a seal between the body and the hydraulic hose by compression may include urging the ferrule towards an interface in the body of the hydraulic component, the interface having a profile of a second truncated cone, the second truncated cone having a second half-aperture. The urging the ferrule towards an interface in the body of the hydraulic component, the interface having a profile of a second truncated cone, the second truncated cone having a second half-aperture may include urging the ferrule, the first half-aperture of the first truncated cone being 39°, towards the interface in the body of the hydraulic component, the interface having the profile of the second truncated cone, the second half-aperture of the second truncated cone being 40°.

In some implementations, the securing the hydraulic hose to the body includes threading a cover plate onto the end section of the hydraulic hose concentric with, and adjacent to, the ferrule, the cover plate positioned further from the open end than the ferrule, and securing the hydraulic hose to the body by securing the cover plate to the body. The securing the cover plate to the body may include securing the cover plate to the body by at least one screw.

In some implementations, the threading a ferrule onto an end section of the hydraulic hose includes threading a metal ferrule onto the end section of the hydraulic hose.

In some implementations, the threading an annular gasket onto the end section of the hydraulic hose includes threading an O-ring onto the end section of the hydraulic hose.

A hydraulic assembly may be summarized as comprising, a hydraulic hose having an end section that terminates at an open end, a ferrule threaded onto the end section of the hydraulic hose, and an annular gasket threaded onto the end section of the hydraulic hose between the ferrule and the open end of the hydraulic hose, wherein the annular gasket is concentric with, and adjacent to, the ferrule.

In some implementations, the ferrule is crimped onto the hydraulic hose and an end of the hydraulic hose protrudes through the annular gasket to hold the annular gasket in place.

In some implementations, the hydraulic assembly further comprises a body having a first port and a second port, and an axial bore extending therebetween, a length of the hydraulic hose inserted into the axial bore through the first port, the length of the hydraulic hose being less than a distance along the axial bore between the first port and the second port. The ferrule may be an annular ferrule having a profile of a first truncated cone, the first truncated cone having a first half-aperture, and wherein the body of the assembly includes an interface to which, during the inserting of the hydraulic hose into the axial bore through the first port, the ferrule is urged, the interface having a profile of a second truncated cone, the second truncated cone having a second half-aperture, the second half-aperture greater than the first half-aperture. A first diameter of the axial bore at the first port may be larger than a second diameter of the axial bore at the second port.

In some implementations, the annular gasket is an O-ring. In some implementations, the hydraulic hose is a thermoplastic hose.

A robot may be summarized as comprising, a robot body, a hydraulic control system physically coupled to the robot body, a hydraulically-actuated component physically coupled to the robot body, the hydraulically-actuated component operable to cause a motion of at least a portion of the robot, and a hydraulic assembly comprising a hydraulic hose, a ferrule threaded onto an end section of the hydraulic hose, and An annular gasket threaded onto the end section of the hydraulic hose, the end section of the hydraulic hose having an open end, the annular gasket being concentric with, and adjacent to, the ferrule, the annular gasket positioned closer to the open end than the ferrule, wherein the hydraulically-actuated component is hydraulically coupled to the hydraulic control system by the hydraulic assembly.

In some implementations, the hydraulic assembly further comprises an assembly body, wherein the ferrule of the hydraulic assembly is an annular ferrule having a profile of a first truncated cone, the first truncated cone having a first half-aperture, and wherein the assembly body includes an interface to which, during a receiving of the hydraulic hose, the ferrule is urged, the interface having a profile of a second truncated cone, the second truncated cone having a second half-aperture, the second half-aperture greater than the first half-aperture.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1A:
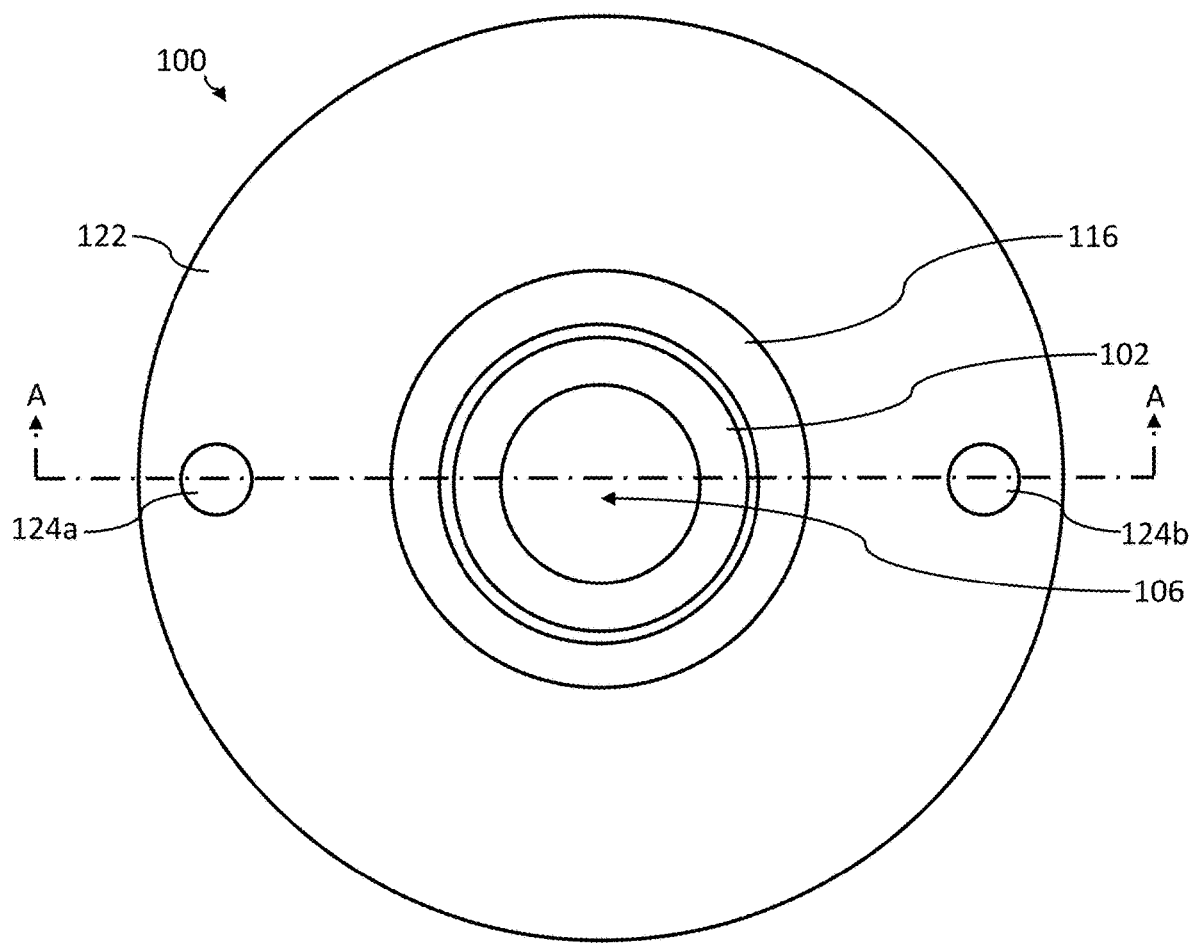
FIGS. 1A and 1B are schematic diagrams of an example implementation of a hydraulic assembly that forms a hydraulic connection between a hydraulic component and a hydraulic hose, in accordance with the present systems, devices, and methods.

The following description sets forth specific details in order to illustrate and provide an understanding of various implementations and embodiments of the present systems, devices, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

The technology described in the present application includes systems, devices, and methods for hydraulically-powered robots. In particular, the present application describes hydraulic fittings and methods for forming a hydraulic fitting on an end of a hydraulic hose. In the present application, elements of the hydraulic fitting in combination with the hydraulic hose are referred to as a hydraulic assembly.

In some applications of robotic systems in general, and humanoid robots in particular, it can be desirable for end effectors to have sufficient power and precision while fitting within a certain form factor. It can also be desirable for couplings (e.g., cables, hoses, wires, etc.) between the end effector and other components of the robotic system to be at least partially internal to the robot. External couplings can be unsightly, and can increase the external dimensions of the robot making it more difficult for the robot to operate in restricted spaces. External couplings can also be a hazard, and may cause damage to the robot, or the robot's environment, if the couplings snag on an object in the robot's environment, for example.

Technology described in the present application includes hydraulic fittings for hydraulic applications including but not limited to hydraulic systems providing power in a robotic system. For example, hydraulic fittings can be used in a hydraulic system providing power to an end effector of a robotic system (e.g., to a hand of a humanoid robot), wherein some or all of the hydraulic system is adapted and/or miniaturized to fit at least partially inside the robot (e.g., inside a robotic arm).

In some implementations, at least a portion of the hydraulic system (e.g., at least one hydraulic hose) is routed through a pivot joint (e.g., a shoulder, an elbow, a forearm, a wrist and/or a knuckle of the robotic arm). A pivot joint can be an example of a restricted space. A restricted space may be restricted in volume, for example. A restricted space may include moving components that can interfere with hydraulic hoses in the space and/or traversing the space, as well as other hydraulic fittings and components in the space. A restricted space may have a volume and/or a shape that can change during operation, e.g. the robot is in motion or is executing a task. In restricted spaces in general, and pivot joints as an example, it can be advantageous for hydraulic fittings to be more compact. It may also be advantageous for a hydraulic hose to have a smaller diameter in restricted spaces, and this can result in one or more additional hydraulic fittings upstream and/or downstream.

An object or shape is defined as humanoid when it has an appearance, or a character, resembling that of a human. For example, a humanoid robot is a robot having an appearance or a character resembling that of a human. A humanoid robot may be "humanoid" in its entirety or may have humanoid components (e.g., a torso, a head, arms, and hands) coupled to non-humanoid components (e.g., a wheeled base). While the following description focuses mainly on a hydraulically-powered humanoid robot, a person of skill in the art will appreciate that a hydraulic system in accordance with the present technology may be used to control a hand, a foot, a tail, a head, or any applicable end effector or actuator in a humanoid or non-humanoid robot.

Using hydraulics to drive a robotic arm and/or an end effector can be advantageous for reasons that include the following:

Hydraulics can provide high speed and strength within a humanoid envelope of shape and size.

To accommodate humanoid envelope constraints, components (e.g., a motor) can be located outside the envelope, or at least outside regions where volume is constrained, and hydraulically coupled to components inside the envelope. Components of a hydraulic system are said to be hydraulically coupled if the components are coupled by a hydraulic fluid.

Hydraulics can provide a high power density especially if the motor is outside the constrained volume.

Hydraulics can at least reduce hysteresis in motion. Hysteresis can manifest as a twitchiness in the movement of the robot. Since hydraulic fluid can be substantially incompressible, there can be little or no potential energy to be released at the moment the static coefficients of friction are exceeded.

Hydraulics can provide centralized power and thereby apply full power onto a single degree of freedom (DOF).

Hydraulics can provide high-fidelity control of the robot, i.e., high precision in the movement of the robot.

Hydraulic systems include hydraulic hoses to provide hydraulic coupling, and hydraulic fittings to secure hydraulic hoses to other hydraulic components, e.g., pumps, valves, and actuation pistons. Conventional fittings can include "push-to-connect", barbed, and compression fittings. Compression fittings may include a leak-tight fitting swage which forms a tubing that can hold the fitting in place. Compression may include the urging of one surface towards another surface. Conventional fittings can include O-ring face seal fittings.

Some conventional fittings are not readily serviceable, and must be replaced if they fail. For example, fittings may deploy O-ring seals where an O-ring is inaccessible, or at least hard to access. Furthermore, conventional fittings may not be designed with compactness in mind.

Figure 1B:
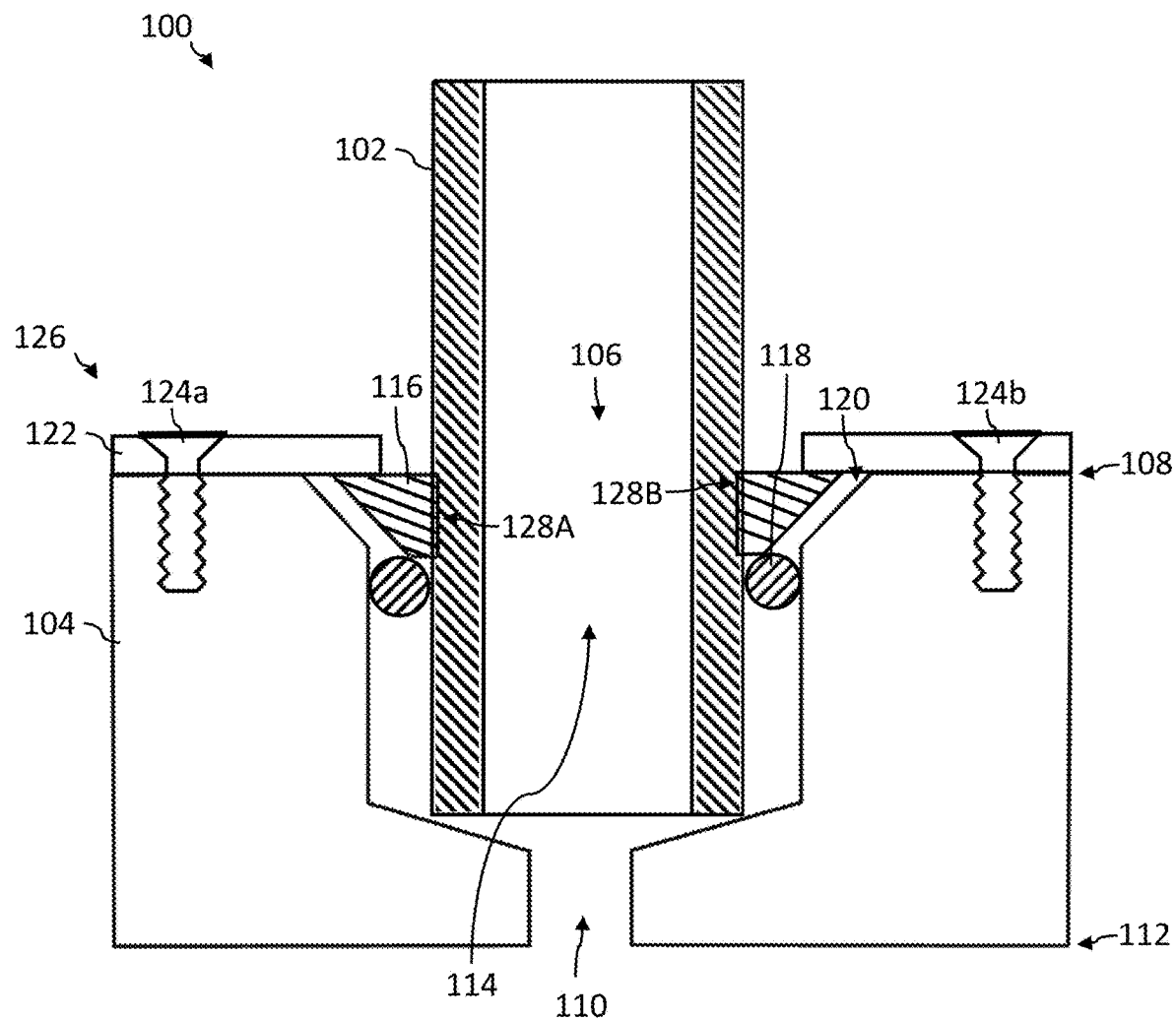

FIGS. 1A and 1B are schematic diagrams of an example implementation of a hydraulic assembly 100 that forms a hydraulic connection between a hydraulic component 126 and a hydraulic hose 102, in accordance with the present systems, devices, and methods. FIG. 1A is a plan view of assembly 100. FIG. 1B is a side view of hydraulic assembly 100 in cross-section along line A-A of FIG. 1A. Hydraulic assembly 100 is described below with reference to both FIGS. 1A and 1B. Some elements of hydraulic assembly 100 are not visible in the plan view of FIG. 1A.

In some implementations, hydraulic component 126 is a hydraulic unit, for example, a hydraulic pump, an actuation piston, a valve, and the like. In other implementations, hydraulic component 126 is a hydraulic routing element, for example, a manifold, a coupling to a hydraulic hose of a different diameter, and the like.

Hydraulic component 126 of assembly 100 comprises a body 104 (shown in FIG. 1B, not visible in FIG. 1A) with an upper port 106 on an upper surface 108 of body 104, and a lower port 110 on a lower surface 112 of body 104. Upper port 106 and lower port 110 are joined by an axial bore 114.

Assembly 100 also comprises a ferrule 116 and an annular gasket 118. Ferrule 116 and annular gasket 118 can be threaded onto hydraulic hose 102 by passing hydraulic hose 102 through ferrule 116 and annular gasket 118 until ferrule 116 and annular gasket 118 are in position on hydraulic hose 102, i.e., until a suitable length of hydraulic hose 102 extends past annular gasket 118. Ferrule 116 may be a metal ferrule, e.g., a stainless steel ferrule. Annular gasket 118 may be an O-ring. Ferrule 116 may be an annular ferrule with a cylindrical bore and a vertical cross-section in the shape of a truncated cone. A vertical cross-section refers in the present application to a cross section defined by a plane passing through the apex of the (truncated) cone and the center of the base. This kind of ferrule is also referred to in the present application as a conical ferrule. In an example implementation, ferrule 116 is a thirty-nine degree (39°) conical ferrule, i.e., a ferrule having a vertical cross-section in the shape of a truncated cone where the cone has a half-aperture of thirty-nine degrees (39°). In other implementations, ferrule 116 has another suitable shape. Ferrule 116 and annular gasket 118 may be concentric.

Ferrule 116 can be crimped to hydraulic hose 102. Ferrule 116 may be crimped to hydraulic hose 102 by squeezing together ferrule 116 and hydraulic hose 102. Crimping may be performed using crimping or swaging equipment, for example. Crimping can cause ferrule 116 and/or at least an outer surface of hydraulic hose 102 to deform. The deforming of ferrule 116 and/or hydraulic hose 102 by crimping can cause ferrule 116 to become fixedly adjoined to hydraulic hose 102 by a clamping of ferrule 116 to the outer surface of hydraulic hose 102. The deforming is illustrated schematically in FIG. 1B at 128A and 128B.

In the present application, ferrule 116 and annular gasket 118, alone or in combination with hydraulic hose 102 and/or elements of hydraulic component 126 to which hydraulic hose 102 is connected, may also be referred to as a hydraulic fitting.

Body 104 may include a conical interface 120 with which ferrule 116 can form a seal with the assistance of annular gasket 118. In some implementations, interface 120 is a forty degree (40°) conical interface.

Ferrule 116 can be secured by a cover plate 122. Cover plate 122 can be fastened to body 104 by screws, e.g., screws 124a and 124b. Ferrule 116 may be secured by another suitable securing mechanism, and cover plate 122 may be fastened to body 104 by another suitable fastener.

In some implementations, a hollow screw (e.g., top hex drive) may be placed atop ferrule 116 and pressed down to deform ferrule 116, with hydraulic hose 102 passing through the hollow screw.

Figure 2:
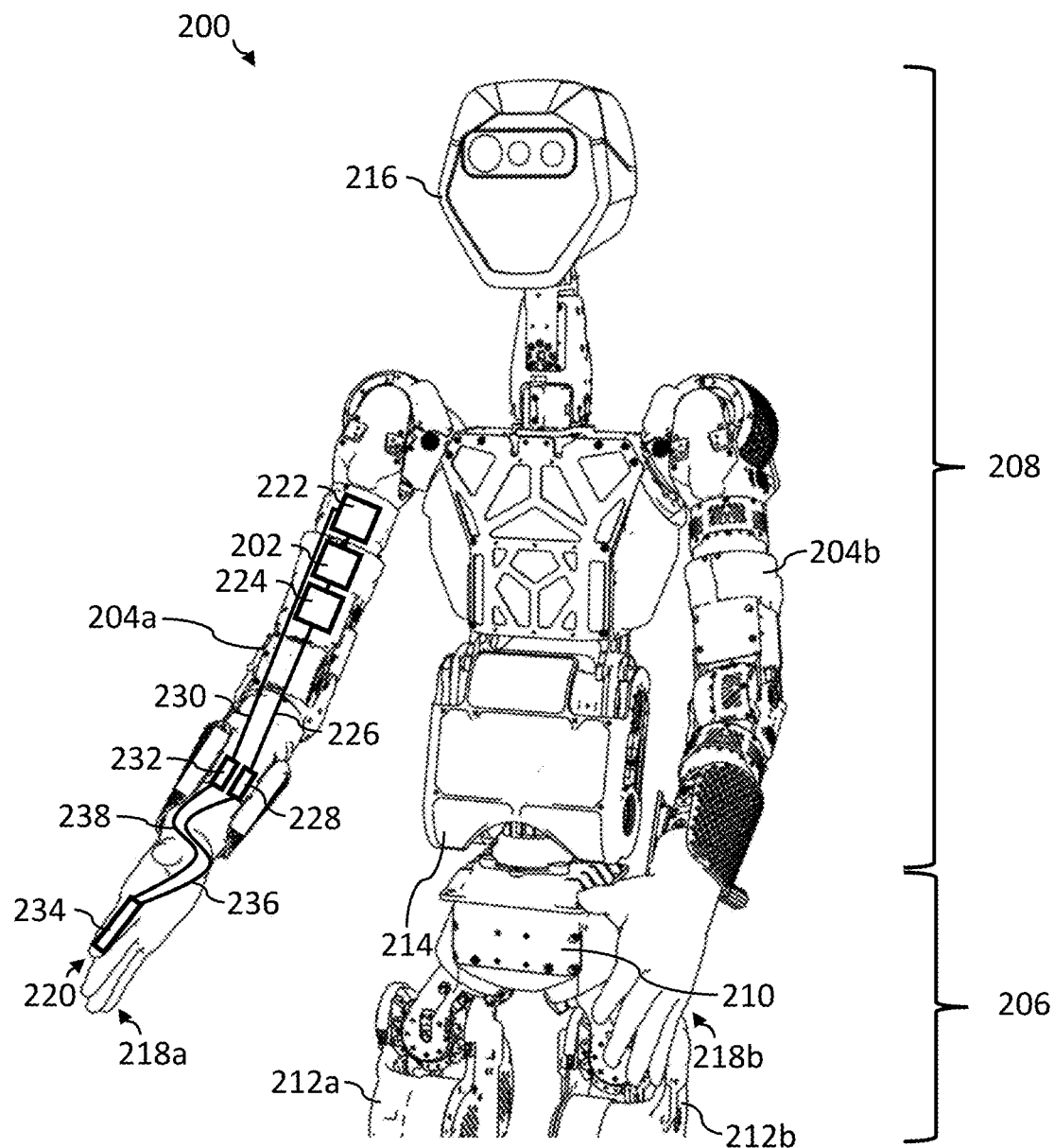
FIG. 2 is a schematic drawing of an example implementation of a hydraulically-powered robot with a hydraulic pump integrated with an arm of the robot, in accordance with the present systems, devices, and methods.

FIG. 2 is a schematic drawing of an example implementation of a hydraulically-powered robot 200 with a hydraulic pump 202 integrated with an arm 204a of robot 200, in accordance with the present systems, devices, and methods. Hoses are also referred to in the present application as hydraulic hoses.

Robot 200 comprises a base 206 and a humanoid upper body 208. Base 206 comprises a pelvic region 210 and two legs 212a and 212b (collectively referred to as legs 212). Only the upper portion of legs 212 is shown in FIG. 2. In other example implementations, base 206 may comprise a stand and (optionally) one or more wheels.

Upper body 208 comprises a torso 214, a head 216, right-side arm 204a and a left-side arm 204b (collectively referred to as arms 204), and a right hand 218a and a left hand 218b (collectively referred to as hands 218). Arms 204 of robot 200 are also referred to in the present application as robotic arms. Arms 204 of robot 200 are humanoid arms. In other implementations, arms 204 have a form factor that is different from a form factor of a humanoid arm.

Hands 218 are also referred to in the present application as end effectors. In other implementations, hands 218 have a form factor that is different from a form factor of a humanoid hand. Each of hands 218 comprises one or more digits, for example, digit 220 of hand 218a. Digits may include fingers, thumbs, or similar structures of the hand or end effector.

In some implementations, base 204 and/or torso 214 of upper body 208 house a hydraulic control system, for example. In some implementations, components of the hydraulic control system may alternatively be located outside the robot, e.g., on a wheeled unit that rolls with the robot as it moves around, or in a fixed station to which the robot is tethered.

The hydraulic control system of robot 200 comprises a hydraulic pump 202, a reservoir 222, and an accumulator 224, housed in arm 204a. Hose 226 provides a hydraulic coupling between accumulator 224 and a pressure valve 228 of the hydraulic control system. Hose 230 provides a hydraulic coupling between an exhaust valve 232 of the hydraulic control system and reservoir 222.

Pressure valve 228 is hydraulically coupled to an actuation piston 234 by a hose 236. Actuation piston 234 is hydraulically coupled to exhaust valve 232 by a hose 238. Hoses 226 and 236, and pressure valve 228, provide a forward path to actuation piston 234. Hoses 230 and 238, and exhaust valve 232 provide a return path to actuation piston 234. Pressure valve 228 and exhaust valve 232 can control actuation piston 234, and can cause actuation piston 234 to move, which can cause a corresponding motion of at least a portion of hand 218a, for example, digit 220.

In some implementations, pressure valve 228 and exhaust valve 232 are electrohydraulic servo valves controlled by a controller (not shown in FIG. 2). The electrohydraulic servo valves are also referred to in the present application as servo valves and servo-controlled valves. The controller may be implemented by any suitable combination of hardware, software, and/or firmware. The controller may include, for example one or more application-specific integrated circuit(s), standard integrated circuit(s), and/or computer program(s) executed by any number of computers, microcontrollers, and/or processors (including, e.g., microprocessors, central processing units). In other implementations, other suitable types of valves may be used.

In other implementations, the hydraulic drive mechanism includes a motor and a drive piston. The drive piston can be propelled forward linearly by a leadscrew that can be coupled to the motor through a flexible shaft coupler. The drive piston can be hydraulically coupled to a hose containing a hydraulic fluid. The hose can extend from the drive piston to an actuation piston located elsewhere on robot 200, for example, in hand 218a. When the drive piston is driven by the motor, the actuation piston can be forced to move, which can cause a corresponding motion of at least a portion of robot 200.

In some implementations, the hydraulic fluid in the hydraulic hoses of FIG. 2 (including hoses 226, 230, 236, and 238) is an oil, for example, peanut oil or mineral oil.

Each of hands 218 may have more than one degree of freedom (DOF). In some implementations, each hand has up to eighteen (18) DOFs. Each DOF can be driven by a respective actuation piston (for example, actuation piston 234). For clarity of illustration, only one actuation piston is shown in FIG. 2. Each actuation piston may be located in hands 218.

Single-action pistons can use a spring to provide a return action for the piston. A DOF may be double-acting to enable a push-pull motion, which means there is a respective hose coupled to each side of the actuation piston. In one implementation, there are two double-acting DOFs, and consequently twenty (20) hoses running to each of hands 218 to control eighteen (18) DOFs of each hand. In some implementations, at least some of the hoses shown in FIG. 2 (e.g., hoses 226, 230, 236, and 238) belong to a bundle of hoses that can accommodate twenty (20) one-eighth inch (⅛ in.) hoses.

In some implementations, a robot with an integrated hydraulic system, such as robot 200 of FIG. 2, may employ any or all of the teachings of U.S. Provisional Patent Application Ser. No. 63/191,732, filed May 21, 2021 and entitled "Systems, Devices, and Methods for A Hydraulic Robot Arm", which is incorporated herein by reference in its entirety.

A hydraulic hose can have one or more tapered sections along a length of the hose. A hydraulic hose with tapered sections can be installed in a robot such that the tapered sections coincide with particular locations along a fluid path, such as restricted spaces and/or parts of the robot requiring greater flexibility.

Though the example implementation of FIG. 2 of a hydraulically-powered robot with only a single hydraulic system, a person of skill in the art will appreciate that a hydraulically-powered robot may include multiple hydraulic systems. In some implementations, at least some of the multiple hydraulic systems are hydraulically-isolated from one another. In some implementations, at least some of the multiple hydraulic systems share a common hydraulic pump.

It can be beneficial for a hydraulically-powered robot to have multiple hydraulically-isolated hydraulic systems. For example, a hydraulically-powered robot may have multiple components or devices that include hydraulic actuators. A single hydraulic system operable to control the hydraulic actuators of multiple components or devices may be too large, complex, or costly for practical implementations. It may be difficult, for example, to route hydraulic hoses from a single shared pump to multiple components or devices located in different regions of the robot (especially internally, as in robot 200). A hydraulic system dedicated to a single component or device, or dedicated to a subset of the multiple components or devices, may be more localized, and more readily adapted to fit within a desired form factor.

Hydraulic assembly 100 of FIGS. 1A and 1B can be used in the hydraulic control system of robot 200 to provide hydraulic coupling of hydraulic hoses (e.g., hoses 226, 230, 236, and 238) to hydraulic components (e.g., hydraulic pump 202, reservoir 222, accumulator 224, pressure valve 228, exhaust valve 232, and actuation piston 234). For example, a hydraulic component may include a body having an upper port and a lower port (e.g., body 104, and upper and lower ports 106 and 110 of FIG. 1) for receiving a hydraulic hose. The hydraulic hose may be inserted into the upper port and secured to the body as described with reference to FIG. 1.

Hydraulic assembly 100 is more compact than other types of hydraulic fitting, and can be beneficially deployed in restricted spaces and/or in situations where there are a large number of hydraulic connections to be made. Hydraulic assembly 100 is more serviceable than other types of hydraulic fitting. For example, gasket 118 can easily be removed and replaced.

Figure 3:
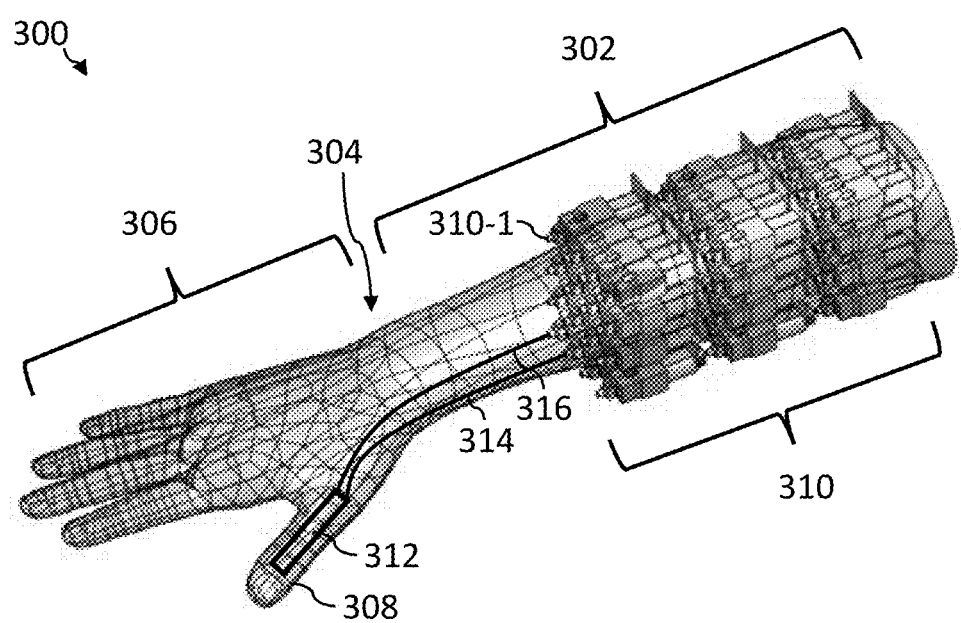
FIG. 3 is a schematic drawing of an example implementation of a portion of a hydraulic system in a forearm, wrist, and hand of a robot (e.g., the robot of FIG. 2), in accordance with the present systems, devices, and methods.

FIG. 3 is a schematic drawing of an example implementation of a portion 300 of a hydraulic system in a forearm 302, wrist 304, and hand 306 of a robot (e.g., robot 200 of FIG. 2), in accordance with the present systems, devices, and methods. Hand 306 includes a digit 308.

Forearm 302 includes a set of valves 310 which is integrated with forearm 302. Valves 310 include valve 310-1. (Only one valve is separately labeled for clarity of illustration.) Valves 310 may include pressure valves and exhaust valves. Valves 310 may include electrohydraulic servo valves, and may be operated by a controller (not shown in FIG. 3).

Digit 308 includes an actuation piston 312 integrated with digit 308. Actuation piston 312 is hydraulically coupled to valves 310 via a pressure hose 314 and an exhaust hose 316.

Pressure hose 314 and exhaust hose 316 pass through wrist 304. Wrist 304 can be a restricted space (as described above), and, while the diameters of hoses 314 and 316 may generally need to be large enough to fulfill the pressure/force requirements of portion 300 of the hydraulic system, it can be advantageous for a respective diameter of each of hoses 314 and 316 to be small enough, and flexible enough, in the region of wrist 304, to navigate wrist 304.

Hydraulic assembly 100 of FIGS. 1A and 1B can be used in portion 300 of the hydraulic control system of FIG. 3 to provide hydraulic coupling of hydraulic hoses (e.g., hoses 314 and 316) to hydraulic components (e.g., valves 310 and actuation piston 312). For example, a hydraulic component may include a body having an upper port and a lower port (e.g., body 104, and upper and lower ports 106 and 110 of FIG. 1) for receiving a hydraulic hose. The hydraulic hose may be inserted into the upper port and secured to the body as described with reference to FIG. 1.

As shown in FIG. 3, forearm 302, wrist 304, and hand 306 can be restricted spaces, and there can a large number of hydraulic connections to be made (e.g., to valves 310). In one implementation, there are two double-acting DOFs, and consequently twenty (20) hoses running to hand 306 to control eighteen (18) DOFs of each hand. In some implementations, there are twenty (20) one-eighth inch (⅛ in.) hoses to accommodate in forearm 302, wrist 304, and hand 306.

Figure 4:
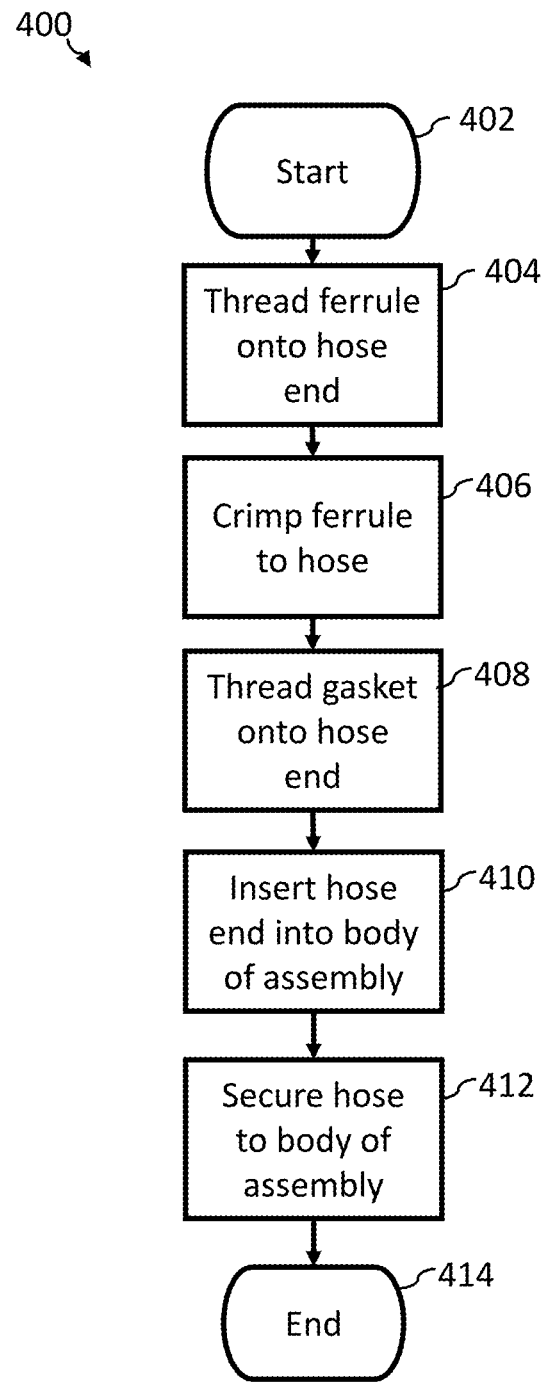
FIG. 4 is a flow chart of an example implementation of a method for forming a hydraulic connection between a hydraulic component and a hydraulic hose, in accordance with the present systems, devices, and methods.

FIG. 4 is a flow chart of an example implementation of a method 400 for forming a hydraulic connection between a hydraulic component and a hydraulic hose, in accordance with the present systems, devices, and methods. Method 400 of FIG. 4 includes seven (7) acts 402, 404, 406, 408, 410, 412, and 414. Those of skill in the art will appreciate that in alternative implementations certain acts of FIG. 4 may be omitted and/or additional acts may be added. Those of skill in the art will also appreciate that the illustrated order of the acts is shown for exemplary purposes only and may change in alternative implementations.

At 402, in response to a starting condition (e.g., receipt of a hydraulic component and a hydraulic hose for connection), method 400 starts. At 404, a ferrule is threaded onto an end section of the hydraulic hose. The threading of the ferrule onto the end section of the hydraulic hose can include passing the hydraulic hose through the ferrule until the ferrule is in position on the hydraulic hose, i.e., until a suitable length of the hydraulic hose extends past the ferrule.

The end section of the hydraulic hose has an open end for hydraulic connection to the hydraulic component. At 406, the ferrule is crimped to the hydraulic hose.

As described above, crimping may be performed using crimping or swaging equipment, for example. Crimping can cause the ferrule and/or at least an outer surface of the hydraulic hose to deform. The deforming of the ferrule and/or the hydraulic hose by crimping can cause the ferrule to become fixedly adjoined to the hydraulic hose by a clamping of the ferrule to the outer surface of the hydraulic hose.

At 408, an annular gasket (e.g., an O-ring) is threaded onto the end section of the hydraulic hose. The threading of the annular gasket onto the end section of the hydraulic hose can include passing the hydraulic hose through the annular gasket until the annular gasket is in position on the hydraulic hose, i.e., until a suitable length of the hydraulic hose extends past the annular gasket. The gasket is concentric with the ferrule and adjacent to the ferrule, with the gasket being closer to the open end of the hydraulic hose than the ferrule. A portion of the end section of the hydraulic hose extends beyond the gasket.

At 410, the end section of the hydraulic hose is inserted into a body of the hydraulic component through a port (e.g., an inlet port). At 412, the hydraulic hose is secured to the body of the hydraulic component. Example methods for securing the hydraulic hose to the body were described above with reference to FIG. 1.

At 414, method 400 ends.

Throughout this specification and the appended claims, infinitive verb forms are often used. Examples include, without limitation: "to provide," "to control," and the like. Unless the specific context requires otherwise, such infinitive verb forms are used in an open, inclusive sense, that is as "to, at least, provide," "to, at least, control," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of robotic systems and hydraulic circuits provided.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A method of forming a hydraulic connection between a hydraulic component and a thermoplastic hydraulic hose, the method comprising:
 forming a hydraulic hose assembly by a process comprising:
  threading a metal ferrule onto an end section of the thermoplastic hydraulic hose, the end section of the thermoplastic hydraulic hose having an open end;
  crimping an inner circumferential surface of the metal ferrule to an outer circumferential surface of the end section of the thermoplastic hydraulic hose to fixedly adjoin the metal ferrule to the thermoplastic hydraulic hose; and
  threading an annular gasket onto the end section of the thermoplastic hydraulic hose between the metal ferrule and the open end of the thermoplastic hydraulic hose, the annular gasket concentric with, and adjacent to, the metal ferrule;
 inserting a length of the hydraulic hose assembly into an axial bore of a body of the hydraulic component such that the metal ferrule and the annular gasket are disposed within the axial bore; and securing the hydraulic hose assembly to the body of the hydraulic component.

2. The method of claim 1, wherein the axial bore extends between a first port and a second port of the body, and wherein the length of the hydraulic hose is less than a distance along the axial bore between the first port and the second port.

3. The method of claim 1, further comprising forming a seal between the body and the hydraulic hose assembly by compression.

4. The method of claim 3, wherein the metal ferrule has a first truncated cone profile, wherein a first section of the axial bore has a second truncated cone profile, and wherein the forming the seal between the body and the hydraulic hose assembly by compression includes urging the metal ferrule towards the first section of the axial bore.

5. The method of claim 3, wherein the securing the hydraulic hose assembly to the body of the hydraulic component includes:
  threading a cover plate onto the end section of the hydraulic hose concentric with, and adjacent to, the metal ferrule, the cover plate positioned further from the open end than the metal ferrule; and
  securing the hydraulic hose assembly to the body by securing the cover plate to the body.

6. The method of claim 5, wherein the securing the cover plate to the body includes securing the cover plate to the body by at least one screw.

7. The method of claim 1, wherein the threading an annular gasket onto the end section of the hydraulic hose includes threading an O-ring onto the end section of the hydraulic hose.

8. A hydraulic assembly comprising:
  a hydraulic component including a body having a first port, a second port, and an axial bore extending from the first port to the second port; and
  a hydraulic hose assembly secured to the body of the hydraulic component, the hydraulic hose assembly comprising:
    a thermoplastic hydraulic hose having an end section that terminates at an open end;
    a metal ferrule having an inner circumferential surface crimped onto an outer circumferential surface of the end section of the hydraulic hose to fixedly adjoin the metal ferrule to the hydraulic hose; and
    an annular gasket threaded onto the end section of the hydraulic hose between the metal ferrule and the open end of the hydraulic hose, wherein the annular gasket is concentric with, and adjacent to, the metal ferrule;
  wherein a length of the hydraulic hose assembly is inserted into the axial bore such that the metal ferrule and the annular gasket are disposed within the axial bore.

9. The hydraulic assembly of claim 8, wherein a length of the hydraulic hose assembly inserted into the axial bore is less than a distance along the axial bore between the first port and the second port.

10. The hydraulic assembly of claim 9, wherein the metal ferrule is an annular metal ferrule having a first truncated cone profile, wherein a first section of the axial bore includes a second truncated cone profile towards which the first truncated cone profile of the metal ferrule is urged.

11. The hydraulic assembly of claim 9, wherein a first diameter of the axial bore at the first port is larger than a second diameter of the axial bore at the second port.

12. The hydraulic assembly of claim 8, wherein the annular gasket is an O-ring.

* * * * *